United States Patent
Cilliers et al.

(10) Patent No.: US 7,033,510 B2
(45) Date of Patent: Apr. 25, 2006

(54) STABILIZED HYPOBROMOUS ACID SOLUTIONS

(75) Inventors: Jan Bastiaan Cilliers, Frankfort (ZA); Martha Sophia Cilliers, Frankfort (ZA)

(73) Assignee: Milbridge Investments (Pty) Ltd., Johannesburg (ZA)

( * ) Notice: Subject to any disclaimer, the term of this patent is extended or adjusted under 35 U.S.C. 154(b) by 0 days.

(21) Appl. No.: 10/469,570

(22) PCT Filed: Mar. 1, 2002

(86) PCT No.: PCT/IB02/00613

§ 371 (c)(1),
(2), (4) Date: Apr. 13, 2004

(87) PCT Pub. No.: WO02/070404

PCT Pub. Date: Sep. 12, 2002

(65) Prior Publication Data

US 2004/0154997 A1  Aug. 12, 2004

(30) Foreign Application Priority Data

Mar. 2, 2001 (ZA) ................................. 01/1795
Jul. 31, 2001 (ZA) ................................. 01/6301

(51) Int. Cl.
*C02F 1/72* (2006.01)

(52) U.S. Cl. ................. 210/754; 210/764; 252/186.36; 252/186.37

(58) Field of Classification Search ................ 210/754, 210/764; 252/180, 186.25, 186.36, 186.37
See application file for complete search history.

(56) References Cited

U.S. PATENT DOCUMENTS

| | | | | |
|---|---|---|---|---|
| 5,385,650 A | * | 1/1995 | Howarth et al. | 205/619 |
| 5,422,126 A | * | 6/1995 | Howarth et al. | 424/723 |
| 5,516,501 A | * | 5/1996 | Kelley | 423/473 |
| 5,942,126 A | * | 8/1999 | Dallmier et al. | 210/756 |
| 6,136,205 A | * | 10/2000 | Dallmier et al. | 210/754 |
| 6,156,229 A | * | 12/2000 | Yang et al. | 252/186.1 |
| 6,303,038 B1 | * | 10/2001 | Sanders et al. | 210/754 |
| 6,419,879 B1 | * | 7/2002 | Cooper et al. | 422/14 |
| 6,495,169 B1 | * | 12/2002 | Moore et al. | 424/703 |
| 6,506,418 B1 | * | 1/2003 | McKinnie et al. | 424/703 |
| 6,620,441 B1 | * | 9/2003 | Kendall et al. | 424/723 |

* cited by examiner

*Primary Examiner*—Betsey Morrison Hoey
(74) *Attorney, Agent, or Firm*—Nixon Peabody LLP; Jeffrey L. Costellia

(57) ABSTRACT

This invention relates to a method for preparing a stabilised stock hypobromous acid solution, and to a stabilised stock hypobromous acid solution. The stabilised stock solution has a hypobromous acid concentration of less than 30% (m/m) and contains an amount of cyanuric acid as a stabiliser not exceeding 1 ppm. The solution may be used for treating any type of water, but has particular application in treating drinking water and irrigation water.

36 Claims, 2 Drawing Sheets

STABILIZED HYPOBROMOUS ACID SOLUTIONS

BACKGROUND OF THE INVENTION

THIS invention relates to stabilised hypobromous acid solutions for the treatment of water.

The use of hypobromous acid solutions in the treatment of industrial waters and recreational waters is well known. Although hypobromous acid is a very effective general-purpose biocide, It is also very unstable. In some applications, hypobromous acid is made in situ by reacting a bromide salt with a water-soluble hypochlorite such as sodium hypochlorite. The solution so produced is added directly to water to be treated, before the hypobromous acid is no longer active.

U.S. Pat. No. 5,942,126, in the name of Nalco Chemical Company, discloses a sodium hypobromide solution that is stable under typical storage conditions. The hypobromite solution is stabilised with high concentrations of a stabiliser which, inter alia, may be selected from the group consisting of urea, thiourea, creatinine, cyanuric acid, alkyl hydantoins, mono or di ethanolamine, organic sulfonamides, biuret, sulfamic acid, organic sulfamates and melamine. This patent teaches the use of this stabilised hypobromite solution in the treatment of industrial water systems.

It is an object of this invention to provide a stabilised hypobromous acid solution for the treatment/disinfection of water, especially drinking and irrigation water.

SUMMARY OF THE INVENTION

According to a first aspect of the invention there Is provided a method for preparing a stabilised stock hypobromous acid solution, for treating water, the method including the following steps:

1. preparing a hypochlorous acid solution with a pH of less than 7.5, preferably of 7.4;
2. preparing a bromide solution with a pH of less than 7.0, preferably of 6.4;
3. mixing the hypochlorous acid solution with the bromide solution to form a hypebromous acid solution; and
4. immediately adding a stabiliser to the solution to provide a stabilised hypobromous acid solution with a pH of from 8 to 9, preferably a pH of 8.8.

The hypochlorous acid solution of step 1 may be prepared by mixing a hypochlorite solution with a pH of about 14 with a hydrochloric acid solution.

Typically, the stabiliser is cyanuric acid which, preferably, is added in an amount not to exceed 1 ppm, advantageously not to exceed 0.5 ppm, in the hypobromous acid solution.

According to a second aspect of the invention there is provided a stabilised stock hypobromous acid solution, for treating water, the solution having a hypobromous acid concentration of less than 30% (m/m) typically less than 20% (m/m) and containing an amount of cyanuric acid as a stabiliser not exceeding 1 ppm.

Advantageously, the solution has a cyanuric acid concentration of less than 0.5 ppm.

Typically, the solution has a pH of 8 to 9, preferably a pH of 8.5 to 8.9, most preferably a pH of 8.8.

Advantageously, stabilised solutions for drinking water have a hypobromous acid concentration of less than 10% (m/m).

Preferred stabilised solutions according to the invention for treating drinking water contain the following amounts of hypobromous acid and cyanuric acid:

1. A hypobromous acid concentration of 9% (m/m) and 0.2 ppm cyanuric acid;
2. A hypobromous acid concentration of 6% (m/m) and 0.3 ppm cyanuric acid; and
3. A hypobromous acid concentration of 3.5% (m/m) and 0.4 ppm cyanuric acid.

A preferred stabilised solution for treating irrigation water will have a hypobromous acid concentration of from 10% to 20% (m/m).

The solution may be a sodium or potassium based hypobromous acid solution, but for the purposes of drinking water and irrigation water, the solution is preferably a potassium based hypobromous acid solution.

Typically, a potassium based hypobromous acid solution has a potassium concentration of less than 20% (m/m), preferably less than 10% (m/m).

The preferred stabilised potassium based hypobromous solutions according to the invention for treating drinking water contain the following amounts of hypobromous acid, potassium, and cyanuric acid:

1. a hypobromous acid concentration of 9% (m/m), a potassium concentration of 3.7% (m/m) and 0.2 ppm cyanuric acid;
2. a hypobromous acid concentration of 6% (m/m), a potassium concentration of 2.1% (m/m) and 0.3 ppm cyanuric acid; and
3. a hypobromous acid concentration of 3.5% (m/m), a potassium concentration of 1.1% (m/m) and 0.4 ppm cyanuric acid.

The preferred stabilised potassium based hypobromous acid solutions according to the invention for treating irrigation water contain the following amounts of hypobromous acid, potassium, and cyanuric acid:

1. a hypobromous acid concentration of 13% (m/m), a potassium concentration of 7% (m/m) and 0.4 ppm cyanuric acid;
2. a hypobromous acid concentration of 16% (m/m), a potassium concentration of 8% (m/m) and 0.3 ppm cyanuric acid; and
3. a hypobromous add concentration of 18% (m/m), a potassium concentration of 9% (m/m) and 0.2 ppm cyanuric acid.

According to a third aspect of the invention there is provided a method of treating water, typically drinking or irrigation water, by adding a stabilised solution of hypobromous acid as described above to the water.

Advantageously, sufficient of a solution of hypobromous add is added to the water to provide a total bromine content of 0.5 to 0.001 mg/l in the water.

Typically, the stabilised solution of hypobromous acid is added to the drinking water in the filter trays of a water treatment plant.

Preferably, the free bromine residue of the treated water is monitored downstream of the water fixters of the water treatment plant and the stabilised solution of hypobromous acid is added at a dosage rate to maintain a free bromine residue of 0.001 to 0.2 mg/l, preferably 0.025 mg/l.

When used to treat irrigation water, the stabilised solution of hypobromous acid may be added directly into irrigation lines, preferably at the beginning of an irrigation water network.

Advantageously, the free bromine residue of the treated water in the irrigation network is monitored downstream in the network and the stabilised solution of hypobromous acid is added at a dosage rate to maintain a free bromine residue of 0.001 to 0.2 mg/l, preferably 0.05 mg/l.

DESCRIPTION OF EMBODIMENTS

Figure 1:
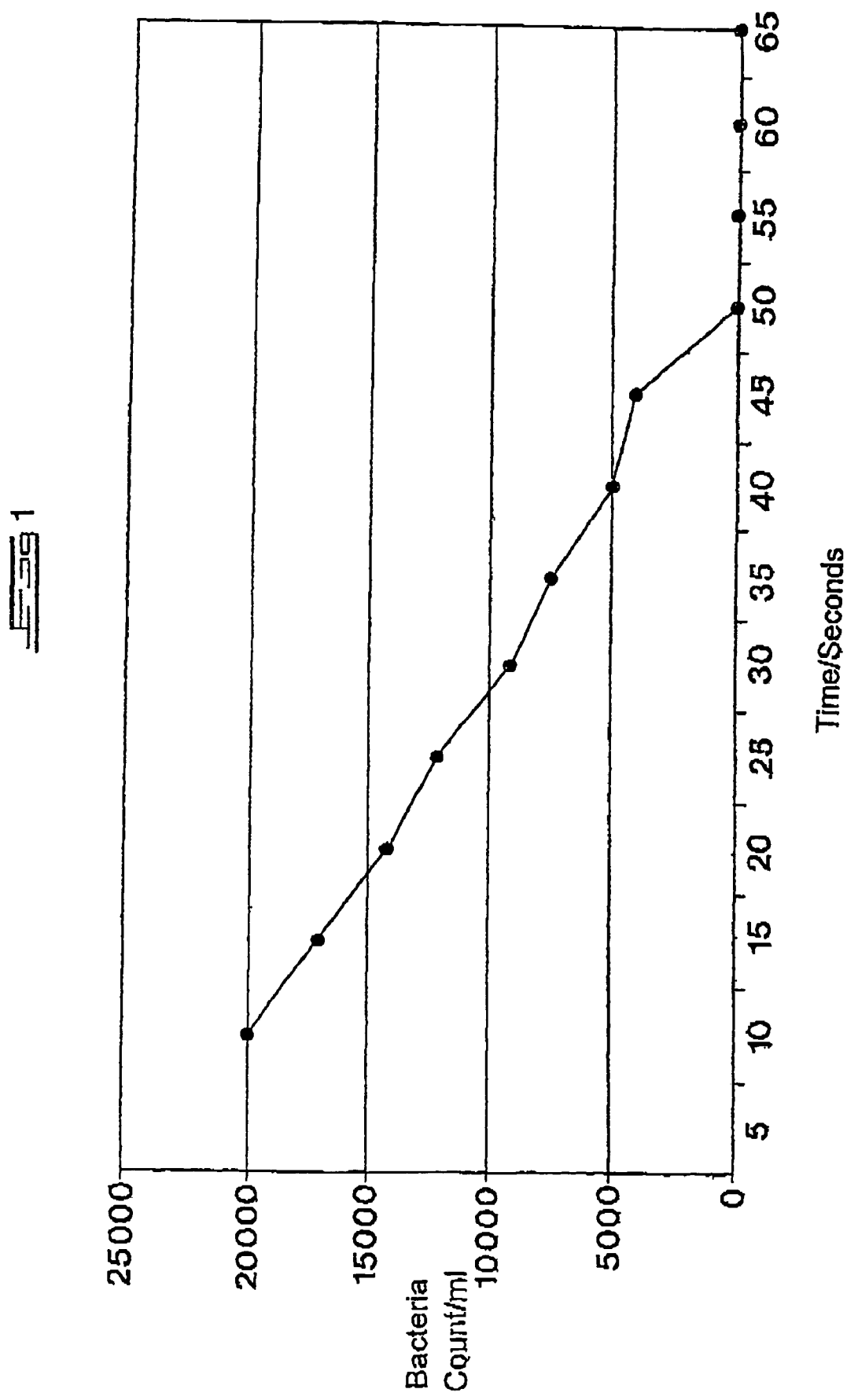
FIG. 1 is a graph showing the kill rate of a stabilised hypobromous acid solution of the invention.

This invention relates to a stabilised solution of hypobromous acid for treating water, in particular for treating drinking water or irrigation water. The stabilised solution is also suitable for treating other types of water such as water in cooling towers and sewerage effluent.

As discussed in the background of the invention, although it is known that solutions of hypobromous acid are useful in destroying micro-organisms, hypobromous acid Is unstable and needs to be stabilised, in order to make it a commercially viable product.

The inventors have devised a new method for preparing a stock hypobromous acid solution and have, surprisingly, found out that the hypobromous acid solution so prepared may be stabilised with low concentrations, i.e. less than 1 ppm, preferably less than 0.5 ppm, of cyanuric acid. Higher concentrations of cyanuric acid have been found to inhibit the action of bromine in destroying micro-organisms, and thus higher concentrations of cyanuric acid cause it to take longer for the hypobromous acid solution to be effective after application to water.

In accordance with the invention, the applicant has prepared stock hypobromous acid solutions containing 3.5%, 6% and 9% (m/m) hypobromous acid which are stabilised with cyanuric acid at a concentration of 0.4 ppm, 0.3 ppm and 0.2 ppm, respectively. The concentration of hypobromous acid is determined by ion chromatography using a Dionex AD 14 ion exchange column, sodium carbonate—sodium bicarbonate as eluent and suppressed conductivity detection. It has been found that these solutions are best stabilised and most reactive at a pH of 8 to 9, preferably at a pH of 8.8. Solutions so stabilised have a shelf-life (in a sealed and light impervious container) of up to 6 months. It will also be seen that the inventors have, most surprisingly, found out that there is an inverse relationship between the concentration of the cyanuric acid stabiliser and the concentration of the hypobromous acid solution.

In another aspect of the invention the inventors have found out that stock solutions of stock hypobromous acid, particularly stabilised solutions as described above, may be used to treat drinking water effectively. In accordance with the invention a stabilised stock hypobromous acid solution is added to drinking water to provide a total bromine content of 0.5 to 0.001 mg/l in the water. The concentration of hypobromous acid in the stock solution used is selected according to the organic matter content in the drinking water. Water containing high amounts of organic matter will make use of a high concentration stock (i.e. the 9%) solution, and water containing low amounts of organic material will make use of a low concentration stock (i.e. the 3.5%) solution.

In a normal drinking water treatment plant lime is added to the water to increase pH from 7.9 to 8.4. A flocculant is then added to the water and a precipitate formed from the flocculant that settles out in clarifiers. A supernatant liquid (drinking water) from the clarifiers then flows through a filtration system. The filtration system includes sand filters. The drinking water from the clarifiers flows through the filters under the force of gravity. Filtration speed is controlled by the "head" on the filter and by way of outlet control valves. The flow rate of water through the filters depends on the filtration plant design, capacity and water pump. The water then flows from the filters through filter trays. Usually, the water has a retention time in the filter trays of 1 to 5 minutes. From the filter trays, water flows to a sump, from where it is pumped to a reservoir. The drinking water then flows, by way of booster pumps, from the reservoir to end users, for example to homes. The homes can be from 3 km to 70 km (or further) away from the water treatment plant.

In accordance with the invention, a stock solution of hypobromous acid is added to water in the water treatment plant, in the filter trays, by way of a venturi system or any other suitable system, for example dosing pumps. The stock solution is added from an inlet point below the water surface, preferably at the bottom of the filter tray. Generally, a sufficient amount of the stock solution is added to the water, to provide a total bromine concentration of 0.001 to 0.5 mg/l in the water. In a preferred embodiment of the invention, a probe is placed in the water line between the sump and the reservoir. The probe tests the oxidation reduction potential in the water, and the amount of stock solution added is adjusted to provide a preferred concentration of the free bromine of 0.025 to 0.1 mg/l. It is envisaged that the probe is connected to a micro-processor which in turn is connected to a dosing system which manipulates the dosage of stock solution added to the water, to provide a preferred concentration of free bromine. The probe sends a reading back to a micro-processor. The probe activates or de-activates the dosing system based on the preset upper and lower set points in the event of equipment malfunction, an alarm is relayed to the operators control room to prevent accidental dosing. The system can also be operated manually.

One of the major advantages of the stock solution according to the invention is that it can be used to treat waters having a relatively wide pH range of 7.0 to 9. After the stock solution has been added to water which is to be treated, free bromine is formed (from the hypobromous acid) in the water. A formula for this reaction is provided below:

$$OBr^- + Br^- + H_2O \rightarrow Br_2 + 2OH^-.$$

It is the free bromine that destroys microorganisms in the water. Without wishing to be bound by theory, it is believed that the free bromine (formed from the hypobromous acid solution) damages the semi-permeable cell membrane of the micro-organism, and either distorts the structure of the cell membrane or breaks the cell membrane. When the structure of the cell membrane is so distorted or broken, components of the organism within the cell leak out of the cell and the micro-organism dies. When drinking water is treated it is imperative that 99%, if not all of the micro-organisms are killed by the disinfectant that is added to the water. If not, surviving microorganisms may, once the disinfectant has lost its effect feed on the remains of micro-organisms that have been killed and proliferate in the "treated" water.

The free bromine is very effective in destroying micro-organisms. It has been possible to obtain a 99% kill rate of micro-organisms in water treated with solutions according to the invention within 60 seconds of adding the stabilised solution to the water. FIG. 1 shows the results of a test conducted to show the effectiveness of a 6% (m/m) hypobromous acid of the solution on bacteria in a water sample. 0.07 mg/l of the 6% (m/m) hypobromous acid solution was added to a water sample containing 20 000 total bacteria species per ml. The total bacteria count was made at time intervals after adding the hypobromous acid solution. The graph clearly shows that 99% of the bacteria are killed within 50 seconds of adding the solution to the water.

Figure 2:
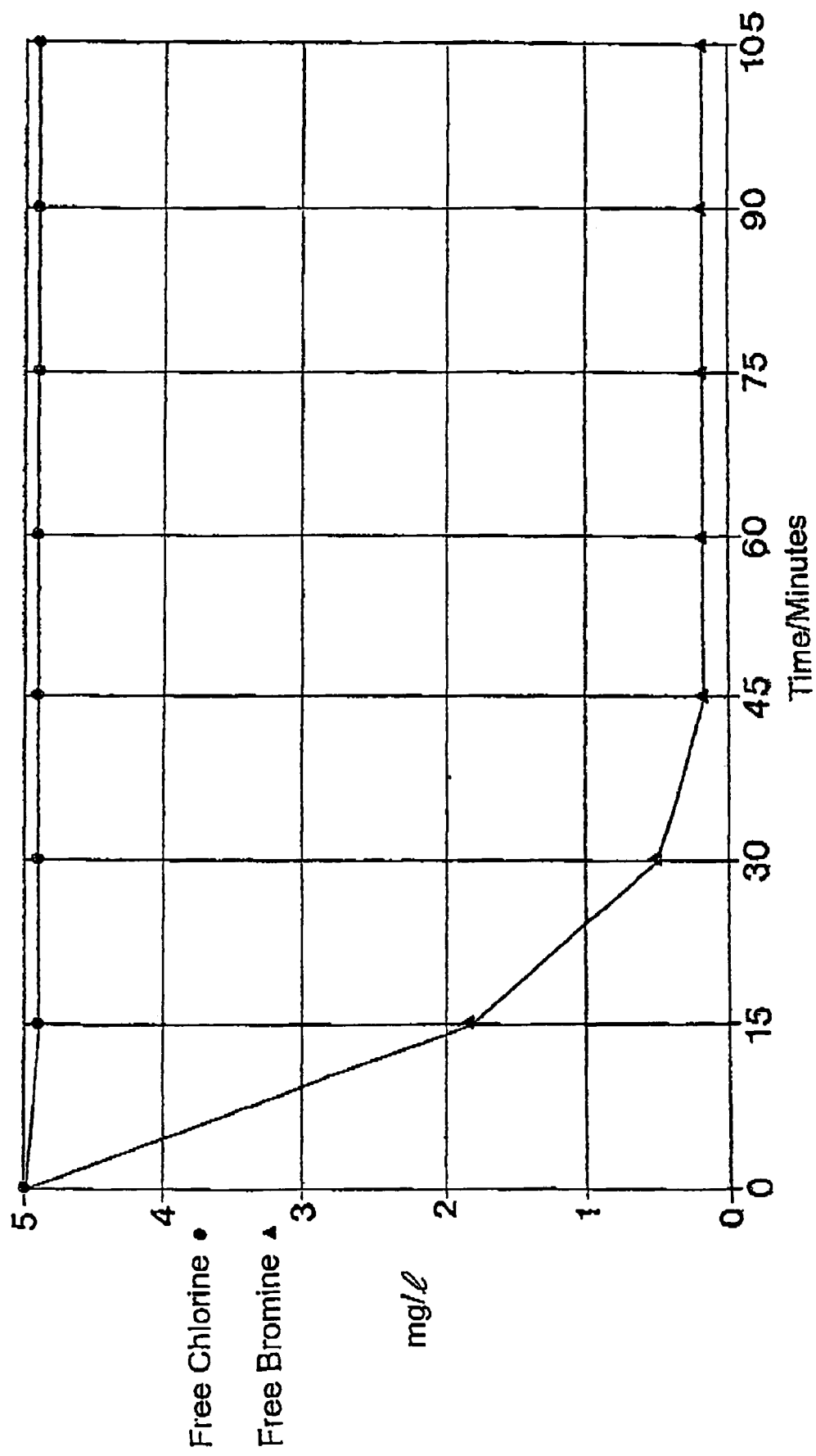
FIG. 2 is a graph showing the decay rate of a 6% (m/m) hypobromous acid stabilised solution of the invention in comparison to a 15% (m/m) hypochlorous acid solution after the solution has been added to water in an amount of 6 mg/l.

Another advantage of the stabilised solution according to the invention is that the activity of the bromine, after being added to the drinking water, is short lived in fact, there is less than 0.2 mg/l, typically about 0.025 mg/l of free bromine residue in the water with 45 minutes of being added to the water, as can be seen in FIG. 2. This means that water treated in accordance with the stabilised solution of the invention can almost immediately (after 45 minutes) be used by consumers as there is a very low bromine concentration (typically about 0.025 mg/l free bromine residue). The free chlorine, on the other hand, remains in the water for a long period of time.

A further advantage of the stabilised stock solution of the invention is that the low free bromine residue of from 0.001 mg/l to 0.2 mg/l, typically about 0.025 mg/l, is maintained in the water for long periods of time, and until the treated water reaches an end user. For example these residues can remain for the time that the treated water is stored in a reservoir, and subsequently pumped 70 km in a water distribution network to the end user. Albeit low, this free bromine residue is sufficient to prevent the proliference of microorganisms in the water from the time that it is treated until it reaches the end user.

Thus, because of the fast kill rate, when a hypobromous acid solution according to the invention is added in the filter trays of a water treatment plant, 99% of micro-organisms in the water are killed before the water leaves the filter tray. And, once the drinking water reaches the end user, there are low concentrations of free bromine in the water. Furthermore, the low concentrations of free bromine in the water ensure that there is no growth of micro-organisms before the drinking water reaches the end user. This is very different to the treatment of water with chlorine, where high amounts of available chlorine are still present in the drinking water, once it has reached the end user. It should also be mentioned that because such low concentrations of cyanuric acid are used in the stock solutions, once added to the drinking water, the concentration of cyanuric acid in the treated drinking water is negligible, and thus will have no effect on end users.

The hypobromous acid stock solutions according to the invention are produced by combining a solution containing bromide ions with a solution containing hypochlorous acid.

The solution containing bromide ions may be formed by dissolving a bromide source in water. The bromide source may be selected from sodium bromide, potassium bromide or lithium bromide. According to a first embodiment of the invention the bromide ion solution is formed by dissolving sodium bromide in water, to provide a 37% solution.

The hypochlorous acid solution may be prepared from an alkali or alkaline earth metal hypochlorite selected from sodium hypochlorite, potassium hypochlorite, magnesium hypochlorite, lithium hypochlorite and calcium hypochlorite. Usually, such a solution has a pH of about 14. The pH of the solution is lowered to below 7.5, by adding hydrochloric acid, to provide a hypochlorous acid solution preferably with a pH of 7.41, and 3.5%, by weight, available chlorine.

The hypochlorous acid and bromide solutions are then combined in quantities to provide the required concentration of hypobromous acid. A formula for this reaction is set out below:

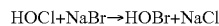

For example, the preferred bromide solution described above is combined with the preferred hypochlorous acid solution described above at a ratio of 1:7.4 of bromide solution to hypochlorous acid solution to provide a 3.5% (m/m) hypobromous acid solution, or combined at a ratio of 1:3.7 of bromide solution to hypochlorous acid solution to provide a 6% (m/m) hypobromous acid solution, or combined at a ratio of 1:1.89 of bromide solution to hypochlorous acid solution to provide a 9% (m/m) hypobromous acid solution.

A stabiliser, in the form of cyanuric acid (dissolved in water which has been heated to 40° C.) is then added immediately to the hypobromous acid solution so formed. A small amount of the cyanuric acid, i.e. less than 1 ppm, preferably less than 0.5 ppm is added. In a preferred embodiment of the invention 0.4 ppm cyanuric acid is added to a 3.5% hypobromous acid solution, 0.3 ppm to a 6% hypobromous acid solution and 0.2 ppm to a 9% hypobromous acid solution.

The stock solutions so produced have been found to have a shelf life of up to six months when stored in a sealed container that is impervious to light.

The hypobromous acid solutions as described above are sodium based solutions, i.e. they are formed by the reaction of hypochlorous acid with a solution of sodium bromide. A problem with the use of a sodium based hypobromous acid solution for treating irrigation water is that the sodium can lead to soil salination. Indeed, the sodium adsorption ratio (SAR) is an index of the potential of a given irrigation water to induce sodic soil conditions (soil sodicity is usually measured by the percentage of a soil's caflon exchange capacity that is occupied by sodium ions). It is calculated from the concentrations of sodium, calcium and magnesium in water and gives an indication of the level at which the exchangeable sodium percentage (ESP) of the soil will stabilise after prolonged irrigation. If the SAR of water is too high, this will cause salinity of the soil. The salinity has a negative effect on roots of plants in the soil and negatively effects the uptake of important micro-elements such as calcium and magnesium.

It has been found that, although more expensive to produce, it is beneficial to use potassium based hypobromous acid stabilised solutions, i.e. solutions formed by the reaction of hypochlorous acid with a solution of potassium bromide. These solutions are also stabilised at low concentrations, i.e. less than 1 ppm, preferably less than 0.5 ppm cyanuric acid. Again, higher concentrations of cyanuric acid have been found to inhibit the action of the bromine in destroying micro-organisms, and thus higher concentrations of cyanuric acid cause it to take longer for the hypobromous acid solution to be effective.

In accordance with the invention, the applicant has prepared potassium-based stabilized hypobromous acid concentrate solutions for treating irrigation water containing 13% (m/m) hypobromous acid and 7% (m/m) potassium, 1.6% (m/m) hypobromous acid and 8% (m/m) potassium, and 18% (m/m) hypobromous acid and 9% (m/m) potassium, which are stabilised with cyanuric acid at a concentration of 0.4 ppm, 0.3 ppm and 0.2 ppm, respectively. The potassium concentration is determined using inductively coupled plasma spectrometry (ICP). Solutions so stabilised have a shelf-life tin a sealed and light impervious container) of up to six months. It has also been found that the solutions are best stabilised and most reactive at a pH of 8 to 9, preferably at a pH of 8.8.

The abovementioned potassium based stabilised stock hypobromous acid solutions are added directly into the irrigation lines to provide a total bromine content in the irrigation water to 0.001 mg/l to 0.5 mg/l in the water. Again, the concentration of the hypobromous acid in the stock solution used is selected according to the organic matter present in the irrigation water irrigation water containing high amounts of organic matter will make use of a high concentration stock (i.e. the 18%) solution, and irrigation water containing lower amounts of organic material will make use of a low concentration stock (i.e. the 13%) solution.

Usually, the solution of potassium based stabilised hypobromous acid concentrate is added to the irrigation water at the beginning of distribution into an irrigation water network. The free bromine concentration of the treated water is monitored downstream and the solution of potassium based stabilised hypobromous acid is added at a dosage rate to maintain a free bromine residue of 0.001 to 0.2 mg/l, typically 0.02 to 0.1 mg/l, preferably 0.05 mg/l.

As with the sodium based hypobromous acid solution, the potassium based hypobromous acid solution is active over a wide pH range of 7 to 9, and it obtains a 99% kill rate of micro-organisms in the irrigation water within 60 seconds of being added to the water. The activity of the bromine is also relatively short lived and there is less than 0.02 mg/l of active bromine in the irrigation water within 45 minutes of being added to the water. Thus, because of the fast kill rate, when a potassium based hypobromous acid solution according to the invention is added directly to the waterlines of an irrigation network, 99% of micro-organisms are killed while the water is being distributed to the network and, by the time the irrigation water reaches the end of the network (and thus the soil), there are low concentrations (less than 0.2 mg/l, typically about 0.01 to 0.1 mg/l) of free bromine (residue) in the water.

A further advantage of potassium based hypobromous acid solutions is that potassium is an important microelement for plant growth and this has the effect of fertilising the soil to which it is applied.

As mentioned above, although the potassium based hypobromous acid solutions according to the invention find particular use in irrigation water, they may also be used for treating drinking water, and other types of water. It is also believed that the potassium added to drinking water is beneficial for human consumers. Such potassium based hypobromous solutions may also be preferred for treating sewerage water as this solution has a better affect on the environment than a sodium based hypobromous acid solution.

Typical potassium based stabilised stock hypobromous acid solutions for treating drinking water contain 3.5% (m/m) hypobromous acid and 1.1% (m/m) potassium, 6% (m/m) hypobromous acid and 2.1% (m/m) potassium, and 9% (m/m) hypobromous acid and 3.7% (m/m) potassium, which are stabilised with cyanuric acid at a concentration of 0.4 ppm, 0.3 ppm and 0.2 ppm, respectively. Solutions so stabilised have a shelf-life (in a sealed and light impervious container) of up to six months. Again, the surprising inverse relationship between the concentration of cyanuric acid stabiliser and the concentration of the hypobromous acid solution is evident. It has also been found that the solutions are best stabilised and most reactive at a ph of 8 to 9, preferably at a pH of 8.8.

The above-mentioned potassium based stabilised hypobromous acid solutions may be added to drinking water (in the manner described above) to provide a total bromine content of 0.001 mg/l to 0.5 mg/l in the water.

The potassium based hypobromous acid solutions according to the invention are produced by combining a solution containing potassium bromide ions with a solution containing hypochlorous acid.

The solution containing bromide ions may be formed by dissolving potassium bromide in water. According to a preferred embodiment of the invention the bromide ion solution is formed by dissolving potassium bromide in water, to provide a 30% (m/m) solution.

The hypochlorous acid solution may be prepared from an alkali or alkaline earth metal hypochlorite solution selected from sodium hypochlorite, potassium hypochlorite, magnesium hypochlorite, lithium hypochlorite and calcium hypochlorite. Usually, such a solution has a pH of about 14.5. The pH of the solution is lowered to about 7.5 by adding hydrochloric acid, to provide a hypochlorous acid solution preferably with a pH of 7.41 and 3.5%, by weight, available chlorine.

The hypochlorous acid and potassium bromide solutions are then combined in quantities to provide the required concentration of a potassium based hypobromous acid. A formula for this reaction is set out below:

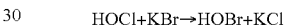

HOCl+KBr→HOBr+KCl

For example, in order to prepare stabilised solutions for treating irrigation water, the preferred potassium based bromide solution described above is combined with the preferred hypochlorous acid solution described above at a ratio of 7.4:1 to provide a 18% (m/m) potassium based hypobromous acid solution with 9% (m/m) potassium, or combined at a ratio of 3.7:1 to provide a 16% (m/m) potassium based hypobromous acid solution with 8% (m/m) potassium, or combined at a ratio of 1.89:1 to provide a 13% (m/m) potassium based hypobromous acid solution with 7% (m/m) potassium.

A stabiliser, in the form of cyanuric acid (dissolved in water which has been heated to 40° C.) is then added immediately to the potassium based hypobromous acid solution so formed. A small amount of the cyanuric acid, i.e. less than 1 ppm, preferably less than 0.5 ppm is added. Sufficient cyanuric acid is added to provide 0.2 ppm cyanuric acid in the 18% (m/m) potassium based hypobromous acid solution, 0.3 ppm in the 16% (m/m) hypobromous acid solution and 0.4 ppm cyanuric acid in the 13% (m/m) potassium based hypobromous acid solution.

The stock solutions so produced have been found to have a shelf life of up to six months when stored in a sealed container that is impervious to light.

EXAMPLE 1

Preparation of Stabilised Stock Sodium Based Hypobromous Acid Solutions for Use in Treating Drinking Water 132.5 l of a sodium hypochlorite solution having 15% available hypochlorite, at a pH of 12.7, was mixed with 365.5 l of water and the pH of this solution is lowered to 7.41 by adding 14.6 g/l of hydrochloric acid (10%), to provide a hypochlorous acid stock solution having a free chlorine content of 3.5%, by weight.

185 kg of sodium bromide was dissolved in 315 l of water to provide a 37%, by weight, sodium bromide stock solution having a pH of 6.4.

EXAMPLE 1A 3.5% Stabilised Sodium Based Hypobromous Acid Solution

A 3.5% (m/m) hypobromous acid solution according to the invention was prepared by mixing 500.24 l of the hypochlorous acid stock solution described above with 67.6 l of the sodium bromide stock solution described above (i.e. the sodium bromide and hypochlorous acid solutions mentioned above are mixed at a ratio of 1:7.4), to form a solution containing 3.5% (m/m) hypobromous acid at a pH of 8.8. 227.14 mg of cyanuric acid (dissolved in water heated to 40° C.) is then added immediately to the solution to provide a concentration of cyanuric acid of 0.4 ppm.

EXAMPLE 1B

6% Stabilised Sodium Based Hypobromous Acid Solution

A 6% (m/m) hypobromous acid solution according to the invention was prepared by mixing 500.02 l of the hypochlorous acid stock solution described above with 135.14 l of the sodium bromide stock solution described above (i.e. the sodium bromide and hypochlorous add solutions mentioned above are mixed at a ratio of 1:3.7), to form a solution containing 6% (m/m) hypobromous acid at a pH of 8.8. 190.55 mg of cyanuric acid (dissolved in water heated to 40° C.) is then added immediately to the solution to provide a concentration of cyanuric acid of 0.3 ppm.

EXAMPLE 1C

9% Stabilised Sodium Based Hypobromous Acid Solution

A 9% (m/m) hypobromous acid solution according to the invention was prepared by mixing 500 l of the hypochlorous acid stock solution described above with 264.55 l of the sodium bromide stock solution described above (i.e. the sodium bromide and hypochlorous acid solutions mentioned above are mixed at a ratio of 1:1.89), to form a solution containing 9% (m/m) hypobromous acid at a pH of 8.8. 152.91 mg of cyanuric acid (dissolved in water heated to 40° C.) is then added immediately to the solution to provide a concentration of cyanuric acid of 0.2 ppm.

EXAMPLE 2

Preparation of Stabilised Stock Potassium Based Hypobromous Acid Solutions 132.5 l of a sodium hypochlorite solution having 15% available as chlorine, at a pH of 14.5 was mixed with 365.5 l of water to provide a hypochlorous acid, solution with a pH of 14.2. The pH of this solution is lowered to 7.5 by adding 14.6 g/l of hydrochloric acid (10%), to provide a hypochlorous acid stock solution having a free chlorine content of 3.5% by weight.

150 kg of potassium bromide was dissolved in 350 l of water to provide a 30%, by weight, potassium bromide stock solution having a pH of 6.9.

EXAMPLE 2A

18% Stabilised Potassium Based Hypobromous Acid Solution

A 18% (m/m) potassium based hypobromous acid solution according to the invention was prepared by mixing 15.91 l of the hypochlorous acid stock solution described above with 117.74 l of the potassium bromide stock solution described above. i.e., the potassium bromide and hypochlorous acid solution mentioned above are mixed at a ratio of 7.4:1 to form a solution containing 18% (m/m) hypobromous acid at a pH of 8.8 and 9% (m/m) potassium. 26.73 mg of cyanuric acid (dissolved in water heated to 40° C.) is then added immediately to the solution to provide a concentration of cyanuric acid at 0.2 ppm.

EXAMPLE 2B

16% Stabilised Potassium Based Hypobromous Acid Solution

A 16% (m/m) potassium based hypobromous acid solution according to the invention was prepared by mixing 57.84 l of the hypochlorous acid stock solution described above with 214.01 l of the potassium bromide stock solution as described above. (i.e. the potassium bromide and hypochlorous acid solution mentioned above are mixed at a ratio of 3.7:1). To form a solution containing 16% (m/m) hypobromous acid at a pH of 8.8 and 8% (m/m) potassium. 81.56 mg of cyanuric acid (dissolved in water heated to 40° C.) is then added immediately to the solution to provide a concentration of cyanuric acid of 0.3 ppm.

EXAMPLE 2C

13% Stabilised Potassium Based Hypobromous Acid Solution

A 13% (m/m) potassium based hypobromous acid solution according to the invention was prepared by mixing 113.23 l of the hypochlorous acid stock solution described above with 214.01 l of the sodium bromide stock solution, described above. (i.e. the potassium bromide and hypochlorous acid solution mentioned above are mixed at a ratio of 1.89:1 to form a solution containing 13% (m/m) hypobromous acid at a pH of 8.8 and 7% (m/m) potassium. 130.9 mg of cyanuric acid (dissolved in water heated to 40° C.) is then added immediately to the solution to provide a concentration of cyanuric acid of 0.4 ppm.

EXAMPLE 3

Preparation of Stabilised Stock Potassium Based Hypobromous Acid Solutions for Use in Treating Drinking Water 132.5 l of a sodium hypochlorite solution having 15% available hypochlorite, at a pH of 12.7, was mixed with 365.5 l of water and the pH of this solution is lowered to 7.41 by adding 14.6 g/l of hydrochloric acid (10%), to provide a hypochlorous acid stock solution having a free chlorine content of 3.5%, by weight.

150 kg of potassium bromide was dissolved in 350 l of water to provide a 30%, by weight, potassium bromide stock solution having a pH of 6.4.

EXAMPLE 3A

3.5% Stabilised Potassium Based Hypobromous Acid Solution

A 3.5% (m/m) potassium based hypobromous acid solution according to the invention was prepared by mixing 117.74 l of the hypochlorous acid stock solution described above with 15.91 l of the potassium bromide stock solution described above (i.e. the potassium bromide and hypochlorous acid solutions mentioned above are mixed at a ratio of 1:7.4), to form a solution containing 3.5% (m/m) hypobromous acid and 1.1% (m/m) potassium at a pH of 8.8. 53.46 mg of cyanuric acid (dissolved in water heated to 40° C.) is then added immediately to the solution to provide a concentration of cyanuric acid of 0.4 ppm.

EXAMPLE 3B

6% Stabilised Potassium Based Hypobromous Acid Solution

A 6% (m/m) stabilised potassium based hypobromous acid solution according to the invention was prepared by mixing 214.01 l of the hypochlorous acid stock solution described above with 57.84 l of the potassium bromide stock solution described above (i.e. the potassium bromide and hypochlorous acid solutions mentioned above are mixed at a ratio of 1:3.7), to form a solution containing 6% (m/m) hypobromous acid and 2.1% (m/m) potassium at a pH of 8.8. 81.56 mg of cyanuric acid (dissolved in water heated to 40° C.) is then added immediately to the solution to provide a concentration of cyanuric acid of 0.3 ppm.

EXAMPLE 3C

9% Stabilised Potassium Based Hypobromous Acid Solution

A 9% (m/m) potassium based stabillsed hypobromous acid solution according to the invention was prepared by mixing 214.01 l of the hypochlorous acid stock solution described above with 113.23 l of the potassium bromide stock solution described above (i.e. the potassium bromide and hypochlorous acid solutions mentioned above are mixed at a ratio of 1:1.89), to form a solution containing 9% (m/m) hypobromous acid and 3.7% (m/m) potassium at a pH of 8.8. 65.45 mg of cyanuric acid (dissolved in water heated to 40° C.) is then added immediately to the solution to provide a concentration of cyanuric acid of 0.2 ppm

The invention claimed is:

1. A method for preparing a stabilized stock hypobromous acid solution including the following steps:
   preparing a hypochlorous acid solution with a pH of less than 7.5;
   preparing a bromide solution with a pH of less than 7.0;
   mixing the hypochlorous acid solution with the bromide solution to form a hypobromous acid solution; and
   immediately adding a stabilizer to the solution to provide a stabilized stock hypobromous acid solution with a pH of from 8 to 9.

2. A method according to claim 1 wherein the hypochlorous acid solution has a pH 7.4.

3. A method according to claim 2 wherein the bromide solution has a pH of 6.4.

4. A method according to claim 3 wherein the stabilized hypobromous acid solution has a pH of 8.8.

5. A method according to any one of claims 1 to 4 wherein the stabilizer is cyanuric acid.

6. A method according to claim 5 wherein the cyanuric acid is added in an amount not to exceed 1 ppm in the hypobromous acid solution.

7. A stabilized stock hypobromous acid solution having a hypobromous acid concentration of less that 30% (m/m) and containing an amount of cyanuric acid as a stabilizer not exceeding 1 ppm.

8. A stabilized stock hypobromous acid solution according to claim 7 having a hypobromous acid concentration of less than 20% (m/m).

9. A stabilized stock hypobromous acid solution according to claim 7 or 8 containing less than 0.5 ppm cyanuric acid.

10. A stabilized stock hypobromous acid solution according to claim 7 or 8 having a pH of 8 to 9.

11. A stabilized stock hypobromous acid solution according to claim 10 having a pH of 8.5 to 8.9.

12. A stabilized stock hypobromous acid solution according to claim 11 having a pH of 8.8.

13. A stabilized stock hypobromous acid solution according to claim 7 or 8 for drinking water, having a hypobromous acid concentration of less than 10% (m/m).

14. A stabilized stock hypobromous acid solution according to claim 13 having a hypobromous acid concentration of 9% of (m/m) and containing 0.2 ppm cyanuric acid.

15. A stabilized stock hypobromous acid solution according to claim 13 having a hypobromous acid concentration of 6% (m/m) and containing 0.3 ppm cyanuric acid.

16. A stabilized stock hypobromous acid solution according to claim 13 having a hypobromous acid concentration of 3.5% (m/m) and containing 0.4 ppm cyanuric acid.

17. A stabilized stock hypobromous acid solution according to claim 7 or 8 for treating irrigation water having a hypobromous acid concentration of from 10% to 20% (m/m).

18. A stabilized stock hypobromous acid solution according to claim 7 or 8 which is potassium based having a potassium concentration of less than 20% (m/m).

19. A stabilized potassium based stock hypobromous acid solution according to claim 18, for treating drinking water, having potassium concentration of less than 10% (m/m).

20. A stabilized potassium based stock hypobromous solution according to claim 19 having a hypobromous acid concentration of 9% (m/m), a potassium concentration of 3.7% (m/m) and containing.

21. A stabilized potassium based stock hypobromous solution according to claim 19 having a hypobromous acid concentration of 6% (m/m), a potassium concentration of 2.1% (m/m) and containing 0.3 ppm cyanuric acid.

22. A stabilized potassium based stock hypobromous solution according to claim 19 having hypobromous acid concentration of 3.5% (m/m), a potassium concentration of 1.1% (m/m) and containing 0.4 ppm cyanuric acid.

23. A stabilized potassium based stock hypobromous acid solution according to claim 18, for treating irrigation water, having a hypobromous acid concentration of 13% (m/m), a potassium concentration of 7% (m/m) and containing 0.4 ppm cyanuric acid.

24. A stabilized potassium based stock hypobromous acid solution according to claim 18, for treating irrigation water, having a hypobromous acid concentration of 16% (m/m), a potassium concentration of 8% (m/m) and containing 0.3 ppm cyanuric acid.

25. A stabilized potassium based stock hypobromous acid solution according to claim 18, for treating irrigation water;

having a hypobromous acid concentration of 18% (m/m), a potassium concentration of 9% (m/m) and containing 0.2 ppm cyanuric acid.

26. A method of treating water by adding a stabilized stock hypobromous acid solution as defined in claim 7 or 8 to the water.

27. A method of treating drinking water by adding a stabilized stock hypobromous acid solution as defined in claim or 8 to the water.

28. A method of treating irrigation water by adding a stabilized stock solution of hypobromous acid as defined in claim 7 or 8 to the water.

29. A method according to, any one of claims 26 to 28 wherein sufficient of the stabilized stock solution of hypobromous acid is added to the water to provide a total bromine content to 0.5 to 0.001 mg/l in the water.

30. A method according to claim 27 wherein the stabilized stock solution of hypobromous acid is added to the drinking water in the filter trays of a water treatment plant.

31. A method according to claim 30 wherein the free bromine residue of the treatment water is monitored downstream of the water filters of the water treatment plant and the stabilized stock of hypobromous acid is added at a dosage rate to maintain a free bromine residue of 0.001 to 0.2 mg/l.

32. A method according to claim 31 wherein the free bromine residue of the treatment water is monitored downstream of the water of water treatment plant and the stabilized stock solution of hypobromous acid is added at a dosage rate to maintain a free bromine residue of 0.025 mg/l.

33. A method according to claim 28 wherein stock solution of hypobromous acid is added directly into irrigation lines of an irrigation water network.

34. A method according to claim 33 wherein the stabilized stock solution of hypobromous acid is added at the beginning of the irrigation water network.

35. A method according to claim 34 wherein the free bromine residue of the treated water in the irrigation network is monitored downstream in the network and the stabilized solution of hypobromous acid is added at a dosage rate to maintain a free bromine residue of 0.001 to 0.2 mg/l.

36. A method according to claim 35 wherein the free bromine residue of the treated water in the irrigation network is monitored downstream in the network and the stabilized solution of hypobromous acid is added at a dosage rate to maintained a free bromine residue of 0.05 mg/l.

* * * * *

UNITED STATES PATENT AND TRADEMARK OFFICE
CERTIFICATE OF CORRECTION

| | |
|---|---|
| PATENT NO. | : 7,033,510 B2 |
| APPLICATION NO. | : 10/469570 |
| DATED | : April 25, 2006 |
| INVENTOR(S) | : Jan Bastiaan Cilliers et al. |

It is certified that error appears in the above-identified patent and that said Letters Patent is hereby corrected as shown below:

Column 12:
    Claim 20, line 47--0.2ppm cyanuric acid-- should be inserted at the end of claim 20;
Column 13:
    Claim 27, line 9 "claim or 8" should read --claim 7 or claim 8--; and
Column 14:
    Claim 36, line 23 "maintained" should read --maintain--.

Signed and Sealed this

Second Day of October, 2007

JON W. DUDAS
*Director of the United States Patent and Trademark Office*